United States Patent [19]
Nojima et al.
[11] Patent Number: 4,994,319
[45] Date of Patent: Feb. 19, 1991

[54] MEMBER FOR DEVELOPING ELECTROSTATIC LATENT IMAGES

[75] Inventors: Kazuo Nojima; Yasuo Hirano, both of Numazu, Japan

[73] Assignee: Ricoh Company, Ltd., Tokyo, Japan

[21] Appl. No.: 199,868

[22] Filed: May 27, 1988

[30] Foreign Application Priority Data

May 30, 1987 [JP] Japan ............................... 62-1334438
Nov. 9, 1987 [JP] Japan ............................... 62-283855

[51] Int. Cl.[5] ......................... B32B 27/08; G036 13/06
[52] U.S. Cl. .................................... 428/335; 428/421; 428/458; 428/465; 428/483; 428/522; 428/906; 430/102; 355/259
[58] Field of Search ............... 428/421, 458, 521, 522, 428/906, 335, 465, 483; 430/102

[56] References Cited

U.S. PATENT DOCUMENTS

| | | | |
|---|---|---|---|
| 4,041,207 | 8/1977 | Takada et al. | 428/421 |
| 4,263,391 | 4/1981 | Saito et al. | 430/125 |
| 4,760,422 | 7/1988 | Seimiya et al. | 355/253 |
| 4,764,841 | 8/1988 | Brewington et al. | 355/259 |
| 4,819,020 | 4/1989 | Matsushiro et al. | 219/216 |
| 4,827,868 | 5/1989 | Tarumi et al. | 118/653 |
| 4,908,665 | 3/1990 | Takeda et al. | 355/245 |

*Primary Examiner*—George F. Lesmes
*Assistant Examiner*—Christopher Brown
*Attorney, Agent, or Firm*—Oblon, Spivak, McClelland, Maier & Neustadt

[57] ABSTRACT

A member for developing electrostatic latent images to visible images is disclosed, which comprises a support, a first coating layer comprising an elastic material formed on the support, and a second coating layer comprising a flexible resin formed on the first coating layer.

4 Claims, 8 Drawing Sheets

MEMBER FOR DEVELOPING ELECTROSTATIC LATENT IMAGES

BACKGROUND OF THE INVENTION

The present invention relates to a member for developing electrostatic latent images for use in a development unit using a non-magnetic one-component toner.

As a development method using a non-magnetic one-component toner, a so-called contact development method is in general use, by which an electrostatic latent image bearing member is brought into contact with a toner transporting member for transporting toner particles charged to a predetermined polarity onto electrostatic latent images for developing the same to visible images.

The toner transporting member (hereinafter referred to as a development roller) is required to have many functions and to meet, for instance, the following requirements: When the electrostatic latent image bearing member is made of a rigid material, the development roller to be used with the electrostatic latent image bearing member is required to have the following properties: (1) appropriate elasticity with a low hardness in order to obtain a nip necessary for development, (2) sufficient recovery properties from compression caused by the contact with the electrostatic latent image bearing member, and (3) allowing a layer to be uniformly coated onto the core of the development roller in order to obtain the desired development characteristics, (4) providing the toner particles on the development roller with the desired charge polarity and charge quantity, (5) sufficient releasability from the toner particles so as not to cause the filming phenomenon, (6) appropriate surface roughness for forming a uniformly thin toner layer on the surface of the development roller, (7) sufficient lubricity to reduce the chatter caused by the frictional resistance during the contact development, and (8) wear-resistance.

To meet the above-mentioned requirements, an elastic body having a low hardness, as usually referred to rubber, is conventionally employed as a coating material for the core of the development roller.

Specific examples of such a rubber are polar rubbers such as nitrile-butadiene rubber (NBR), epichlorohydrin rubber (ECO), acrylic rubber, and chloroprene rubber, and high resistance rubbers such as silicone rubber, ethylene-propylene rubber, and styrene-butadiene rubber, in which particles with a low electric resistivity such as carbon and metal powder, serving as resistance adjusting agent, are dispersed. These rubbers are molded into a development roller on a cylindrical core by a conventional molding method such as press-molding and vapor-molding.

However, the conventional development rollers can not satisfy all of the above requirements.

In particular, the above-mentioned requirements (1) through (3) are essential for the contact development method. However, it is difficult to obtain a development roller which satisfies not only requirements (1) to (3), but also the requirements (4) to (8) for the surface properties of the development roller.

This difficulty stems from, for example, the following facts. When the hardness of a rubber used for the development roller is decreased, sufficient surface grinding properties cannot be obtained, resulting in the difficulty in finishing the surface of the rubber with a desired surface roughness (Rz) expressed as a value of the order of less than several μm. In addition, such a rubber has not only a tendency to have a large frictional resistance to the member which comes into contact therewith because of its surface adhesiveness, but also a tendency to easily wear because of its low hardness. When the polar rubber is used for the development roller, toner particles persistently adhere to the surface of the development roller due to its poor releasability from toner, resulting in the toner filming. Accordingly, the charge quantity of the toner is changed, so that the deposition amount of the toner on the development member becomes non-uniform, and accordingly images become non-uniform in quality.

SUMMARY OF THE INVENTION

It is therefore an object of the present invention to provide a development member with improved toner releasability and resistance to abrasion, from which the above-mentioned conventional shortcomings are eliminated.

Another object of the present invention is to provide a function-separated type development roller by providing a second coating layer having a uniform volume resistivity.

The above objects of the present invention is attained by a development member which comprises a first coating layer made of an elastic material formed on a support, and a second coating layer made of a flexible synthetic resin formed on the first coating layer, which development member may be a development roller, and is brought into contact with an electrostatic latent image bearing member for development of electrostatic latent images to visible toner images.

In particular, to attain the above-mentioned objects, it is preferable to form the second coating layer by coating onto the first coating layer a solvent-type semiconductive coating liquid which is prepared by dispersing carbon black uniformly in a flexible synthetic curable resin solution.

DETAILED DESCRIPTION OF THE PREFERRED EMBODIMENTS

Figure 1:
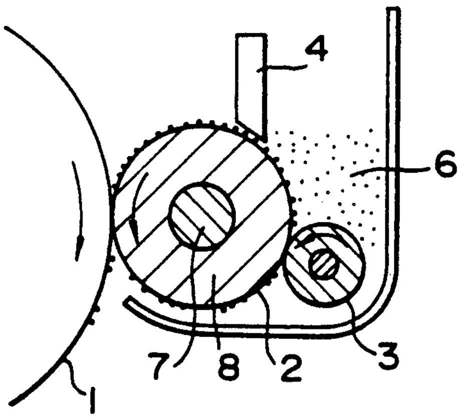
FIG. 1 is a schematic cross-sectional view of an example of a development unit using a development roller.
Figure 2:
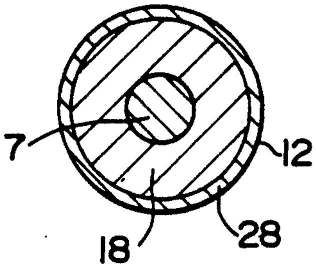
FIG. 2 is a schematic cross-sectional view of a development member for developing electrostatic latent images in the form of a roller according to the present invention.

According to the present invention, the development member is generally used in the form of a development roller as shown in FIG. 1 and FIG. 2, but it is not limited to such a cylindrical form like a roller, so long as it performs the same functions as the roller-shaped development member. For example, a belt form as shown in FIG. 3 can also be employed in the present invention.

In FIG. 1, reference numeral 1 indicates a photoconductor drum, reference numeral 2, a development roller for supplying a developer 6 onto the photoconductor drum 1, reference numeral 3, a developer supply roller for supplying the developer 6 onto the development roller 2, reference numeral 4, a developer layer regulating member for regulating the thickness of a layer of the developer 6 on the development roller 2. The development roller 2 consists of a core 7 and an outer layer 8.

In FIG. 2, reference numeral 12 indicates a development roller according to the present invention, which comprises a core 7, a first coating layer 18 and a second coating layer 28.

Figure 3:
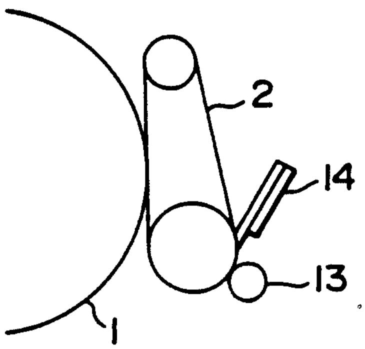
FIG. 3 is a schematic cross-sectional view of a development member for developing electrostatic latent images in the form of a belt according to the present invention.

In FIG. 3, reference numeral 2 indicates a development member in the form of a belt, reference numeral 13, a developer supply roller for supplying the developer onto the development member 2, and reference numeral 14, a developer layer regulating member for regulating the thickness of a layer of the developer on the development member 2.

Figure 17:
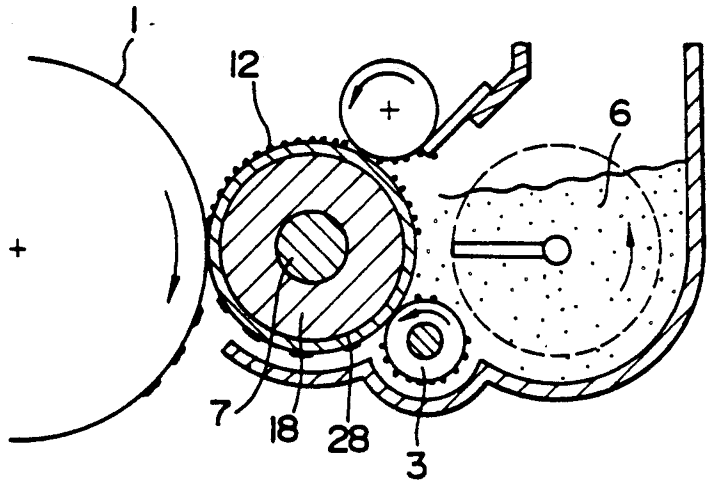
FIG. 17 is a schematic cross-sectional view of another example of a development unit using a development roller.

FIG. 17 schematically shows a development unit in which a development roller 12 according to the present invention is employed.

The constituent elements of the development member will now be explained in detail.

First Coating Layer

Any elastic material for use in the conventional development member can be used for the first coating layer for use in the present invention. An elastic material having a volume resistivity ($\rho$) of $10^6$ to $10^{11}$ Ω·cm, which is in a medium resistivity range, is preferable for the present invention.

Specific examples of the rubber for forming a stable elastic body with a uniform volume resistivity are polar rubbers such as nitrile-butadiene rubber (NBR), epichlorohydrin rubber (ECO), acrylic rubber, and chloroprene rubber. Moreover, silicone rubber, urethane rubber, ethylene-propylene rubber, and styrene-butadiene rubber, with a resistivity adjusting agent such as carbon black and metal oxide particles being dispersed, can be employed. Of these rubbers, nitrile-butadiene rubber (NBR) and epichlorohydrin rubber (ECO) and mixtures thereof are preferable for use in the present invention.

NBR and ECO have the advantage over other rubbers in that the volume resistivity thereof can be readily set in a medium resistivity range. More specifically, when NBR is employed, the volume resistivity can be easily adjusted by the change in the content amount of nitrile therein. In the case where ECO is employed, ECO exhibits a polarity and the volume resistivity thereof is in the range of $10^6$ to $10^7$ Ω·cm due to the chlorine bonds thereof. Therefore, by use of NBR, ECO and mixtures thereof, the volume resistivity can be readily adjusted to the range of $10^6$ to $10^{11}$ Ω·cm, while other requirements for practical use, such as low hardness, resistance to abrasion, and resistance to compressive strain, are maintained.

When a mixture of NBR and ECO is employed as the first coating layer, a more reliable development member can be provided since its resistance to ozone is further improved in comparison with a layer made of only NBR.

Second Coating Layer

The second coating layer is a top layer of the development member. Since toner particles come into contact with the second coating layer, the second coating layer made of a flexible synthetic resin is required to have a sufficient releasability from the toner particles and a volume resistivity ($\rho$) of $10^6$ to $10^{11}$ Ω·cm, which is in the same range of the volume resistivity of the first coating layer. A recommendable thickness of the flexible synthetic resin layer ranges from 5 to 70 μm. Within this range, 5 to 60 μm is preferable, 20 to 50 μm is more preferable, and the best range is 30 to 50 μm.

It is preferable that the elongation of the above-mentioned synthetic resin be in the range of 10 to 500%, more preferably 30 to 300%. When the elongation ratio of the synthetic resin used for the second coating layer is 10% or less, the compatibility with the elastic body with a low hardness used for the first coating layer becomes poor, so that cracks are formed when the development roller is compressed. When the elongation ratio of the synthetic resin used for the second coating layer exceeds 500%, the desired surface roughness cannot be obtained because of the difficulty in grinding the surface.

When the thickness of the synthetic resin layer is less than 5 μm, the elastic material of the first coating layer has too strong an effect on the second coating layer, so that the thickness of the second coating layer tends to become relatively non-uniform. On the other hand, when the thickness of the synthetic resin layer exceeds 70 μm advantageous effects of the first coating layer diminish due to the thickness of the second coating layer. In any event, the thickness of the second coating layer will have to be determined, with the properties of the employed resin, such as electrical characteristics (generally, the higher the volume resistivity, the thinner the layer) and the resistance to abrasion (the higher the resistance to abrasion, the thinner the layer), and the compatibility with the first coating layer, taken into consideration.

Specific examples of the synthetic resin for use in the second coating layer with the required properties as mentioned above are silicone resin, urethane resin, fluoroplastic, and modified fluoroplastic.

In particular, a solvent-soluble fluoroplastic is preferable for forming the second coating layer.

The above solvent-soluble fluoroplastic is an amorphous polymer prepared by copolymerization of a fluoro-olefin and a hydrocarbon vinyl ether (if necessary, a plurality of vinyl ethers are used). The details can be referred to Kojima and Yamabe, Journal of Organic Synthesis Chemical Society 42 (8), 841 (1984); Munakata, Miyazaki, Kaya and Takayanagi, Asahi Glass Research Report 34 (2), 205~224 (1984) and Japanese Patent Publications 63-1962, 63-2304 and 63-2992.

Although the fluorine content of the above solvent-soluble fluoroplastic is as comparatively low as 25 to 32 wt. %, this fluoroplastic has high chemical stability and durability. This is because the solvent-soluble fluoroplastic is an alternating copolymer of fluoro-olefins and hydrocarbon vinyl ethers, in which thermally and chemically stable fluoro-olefins are regularly arranged to protect unstable hydrocarbon vinyl ethers electronically and stereochemically.

By varying the kind of the above-mentioned hydrocarbon vinyl ether constituting the alternating copolymer and the relative amount ratio thereof, the solubility in organic solvents, curing characteristics, affinity for curing agents and pigments of the resin, and the hardness and flexibility of the coating film can be readily caused to correspond to the required physical properties of the resin.

Since the above copolymer is soluble in organic solvents, crosslinking of the polymer is necessary after the completion of coating in order to impart the solvent-resistance to the coating film. Therefore, copolymerization of vinyl ethers containing reactive hydroxyl groups is most preferable to form a resin structure in which crosslinking and curing are readily caused to occur by a polyfunctional isocyanate. To improve the affinity for other resins and pigments, a carboxyl group can be introduced as a polar group.

Basic resin characteristics of fluoro-olefin - vinyl ether copolymer are shown as follows.

| | |
|---|---|
| (1) Fluorine content (wt. %) | 25~32 |
| (2) Specific gravity | 1.4~1.5 |
| (3) OH value (mg KOH/g-resin) | 40~150 |
| (4) Acid value (mg KOH/g-resin) | 0~30 |
| (5) Molecular weight | Mn = $0.4 \times 10^4 \sim 10 \times 10^4$<br>Mw = $0.8 \times 10^4 \sim 20 \times 10^4$ |
| (6) Glass transition point (°C.) | 0~70 |
| (7) Heat decomposition starting temperature (°C.) | 240~250 |
| (8) Solubility parameter | 8~9 |

To impart the medium resistivity to the above-described resin, a resistance adjusting agent, such as carbon black, metal particles, and particles of metal oxide such as tin oxide and titanium oxide, is dispersed in the resin.

Among these agents, the carbon black is most suitable with due consideration to the viewpoint that the addition of the resistance adjusting agent may be as small as possible to place the resin in the medium resistivity range, without changing other properties of the polymer.

In particular, carbon black having a volatile content of 2.5 to 9.6% may be selected so as to form the second coating layer with a good stable volume resistivity. More specifically, on the surface of this kind of carbon black a comparatively large amount of oxygen is chemically adsorbed. A solvent-type resin composition having a medium resistivity which is prepared by dispersing the carbon black uniformly in the resin shows good dispersion stability. As a matter of course, the above-mentioned resin composition in which a carboxyl group is introduced to improve the affinity for the carbon black shows much improved dispersion stability. Thus, a stable second coating layer with a uniform volume resistivity ($\rho$) can be obtained by a method which will be mentioned later.

Furthermore, a variety of particles can be dispersed in the resin to improve other properties of the resin.

For example, a reinforcing material, such as synthetic silicic acid, diatomaceous earth, calcium carbonate, clay, acid clay, silica, magnesium carbonate, talc, asbestos, titania, alumina, glass flakes, and whisker, may be dispersed. As an external lubricant, metal soap, fatty acid, fatty acid amide and wax can be used, and as an antistatic agent, a variety of conductive fine particles such as carbon black, tin oxide, zinc oxide, zinc sulfide, titanium oxide and titanium nitride can be employed, and surfactants may also be added.

The second coating layer can be prepared by dispersing the above-mentioned resin and resistance adjustment agent in a ball mill or sand mill, controlling the viscosity of the dispersion with the addition of a solvent and a curing agent to prepare a coating liquid, and then applying the coating liquid to the first coating layer by spray coating, roll coating or dip coating so as to form a second coating layer having a thickness of 5 to 70 μm. Alternatively a second coating layer having a thickness of 5 to 60 μm may be formed on an NBR layer or a mixed layer of NBR and ECO.

In the course of forming the second coating layer, a primer is applied to impart sufficient adhesion between the first coating layer and the second coating layer. When the second coating layer is formed on an NBR layer or a mixed layer of NBR and ECO, the primer is also applied.

The scatter of the volume resistivity of the second coating layer can be readily minimized by use of a sufficiently uniformly dispersed coating liquid.

It is preferable that the volume resistivity of the second coating layer be in the range of $10^6$ to $10^{11}$ Ω·cm.

The reason is that the electrical field on the photoconductor formed by electrostatic latent images is controlled by the resistivity of the coating layer of the development roller. Therefore, when the electrical conductivity of the coating layer of the development roller is extremely high, no peripheral electrical field is generated on the photoconductor. In contrast to this, when the coating layer of the development roller is highly insulating, the voltage contrast is decreased at the central portion in the electrostatic latent images, so that the image density is decreased at the central portion.

The above-mentioned phenomenon will now be explained with reference to a graph shown in FIG. 7, in which a development roller with a coating layer having a thickness of 6 mm is employed.

Figure 7:
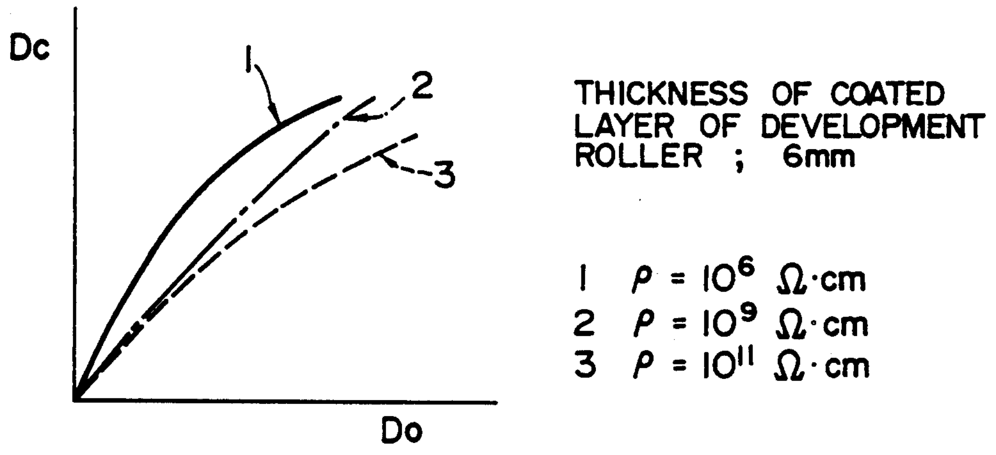
FIG. 7 is a graph showing the effects of the volume resistivity of a coating layer on the relationship between the density of an original image and the density of the copy image thereof.

FIG. 7 shows image reproduction curves, with original image density (Do) as abscissa, and copy image density (Dc) as ordinate.

With respect to the coating layer of the development roller having a volume resistivity ($\rho$) of $10^6$ Ω·cm, the image reproduction curve bends in a high Dc region, resulting in that copied images are slightly defaced.

When the volume resistivity ($\rho$) of the coating layer of the development roller is $10^9$ Ω·cm, the image reproduction curve approaches a straight line with a gradient close to 1, resulting in high faithful reproduction.

Furthermore, when the volume resistivity ($\rho$) is $10^{11}$ Ω·cm or more, the gradient of the image reproduction curve is under 1, and the Dc values do not increase in the high Do region, resulting in the formation of images with a low contrast.

Thus, when the volume resistivity ranges from $10^6$ to $10^{11}$ Ω·cm, no problem occurs in practical use. However, when the volume resistivity is under $10^5$ Ω·cm, or over $10^{12}$, it is not suitable for practical use.

As mentioned above, the volume resistivity ($\rho$) of the coating layer of the development roller is an important basic characteristic when using the contact development method.

The present invention will now be explained by referring to the following examples.

Preparation Example of First Coating Layer

In accordance with the formulations shown in Table 1, a mixture of the components in each composition was kneaded in a two-roll mill so as to be uniformly dispersed, and then vulcanized in the conditions indicated in Table 1 to form an elastic layer with a thickness of 6 mm, with an outer diameter of 20 mm (the core diameter thereof being 6 mm), followed by subjecting the elastic roller to a secondary vulcanization at 150° C. for 4 hours.

The volume resistivity and the rubber hardness of the molded roller are shown in Table 1.

TABLE 1

| Material | Maker | Acrylonitrite (%) | Formulation 1-1 | Formulation 1-2 | Formulation 1-3 | Formulation 1-4 | Formulation 1-5 | Formulation 1-6 |
|---|---|---|---|---|---|---|---|---|
| Formulation | | | | | | | | |
| NBR: JSRN215SL | Japan Synthetic Rubber Co., Ltd. | 48 | 100 | | | | | 100 |
| JSRB250S | Japan Synthetic Rubber Co., Ltd. | 20 | | 100 | | | | 100 |
| JSRN260S | Japan Synthetic Rubber Co., Ltd. | 15 | | | 100 | 100 | | |
| NIPOL1312 | Japan Zeon Co., Ltd. | 32 | 20 | 30 | | | | 20 |
| NIPOLDN401 | Japan Zeon Co., Ltd. | 18 | | | 30 | 30 | 30 | |
| CHC:* Epichlomer C | Ohsaka Soda Co., Ltd. | — | | | | 56 | 130 | 300 |
| Zinc white | — | — | 3 | 5 | 5 | 6 | 9 | 11 |
| Stearic Acid | — | — | 1 | 1 | 1 | 1 | 1 | 1 |
| Zinc Stearate | — | — | | | | 0.5 | 1.5 | 3 |
| Sulfur | — | — | 1 | 1 | 1 | 1.5 | 2 | 4 |
| Brown Factice | Nagai Seiyaku-sho Co., Ltd. | — | 10 | 10 | 10 | 10 | 10 | 10 |
| | | Total | 135 | 147 | 147 | 205 | 283.5 | 449 |
| Vulcanizing Time 160° C. × (minute) | | | 30 | 30 | 30 | 30 | 30 | 30 |
| Vulcanizing Pressure (kg/cm²) | | | 100 | 100 | 100 | 100 . | 100 | 100 |
| Characteristics | | | | | | | | |
| Volume Specific Resistance (Ω · cm) | | | $8 \times 10^6$ | $3 \times 10^3$ | $1 \times 10^{11}$ | $4 \times 10^{10}$ | $3 \times 10^3$ | $3 \times 10^7$ |
| Rubber Hardness | | | 39 | 35 | 35 | 34 | 35 | 37 |
| Resistance to Ozone | | | A2 | A2 | A2 | A2 to A1 | A1 | A1 |

*CHC: Epichlorohydrin rubber

The volume resistivity of the roller was measured by a commercially available test meter (Trademark "Electrometer 610C" made by Kessler Co.) after allowing the sample roller to stand at 20° C. and 60% RH for 16 hours. The electrodes used for the measurement were a copper foil tape (No. 1245, made by 3M Corp.) having a width of 10 mm, and the gap between a main electrode and a guard electrode was set at 1 mm.

The rubber hardness and permanent compressive strain were measured in accordance with the Japanese Industrial Standards (JIS) K6301 dealing with the vulcanized rubber physical testing method.

The resistance to ozone was measured in accordance with the ozone deterioration test in JIS K6301.

The testing method and the evaluation criteria are as follows.

| | | |
|---|---|---|
| (1) | Ozone concentration and exposure temperature | 5 ppm, 50° C. |
| (2) | Exposure period | 3 weeks |
| (3) | Evaluation criteria of deterioration | Refer to Table 2. |

TABLE 2

| Number of cracks | Magnitude and depth of cracks | |
|---|---|---|
| A: Few cracks | A1 | Invisible to the naked eye but can be confirmed at 10 × magnification. |
| | A2 | Can be seen with the naked eye. |
| B: Many cracks | B1 | Deep and comparatively large cracks (less than 1 mm). |
| | B2 | Deep and large cracks (1 mm or greater, but less than 3 mm). |
| C: Infinite No. of cracks | C | Cracks 3 mm or greater, or appear to cut right through. |

Preparation Example of Second Coating Layer (A) Urethane Resin - Carbon Black Dispersed System The following components were dispersed in a ball mill for 48 hours to prepare a masterbatch.

| | |
|---|---|
| Polyester urethane resin (Trademark "Yulac C-2300" made by Hirono Chemical Co., Ltd.) | 100 g |
| Carbon black (Trademark "Black Pearl L" made by Cabot Corp.) | 20 g |

Based on the masterbatch, a main ingredient and a curing agent were added in the following four F/R ratios (Resistance adjusting agent content/Resin solid content). The levels of the F/R ratio are shown in Table 3.

TABLE 3

| F/R Ratio |
|---|

TABLE 3-continued

| | 0.08 | 0.12 | 0.16 | 0.20 |
|---|---|---|---|---|
| Masterbatch | 10.0 g | 10.0 g | 10.0 g | 10.0 g |
| Yulac C-230U (Main ingredient) | 37.3 g | 21.7 g | 14.5 g | 10.0 g |
| Yulac PU-614 (Curing agent)(a) | 13.7 g | 9.0 g | 6.9 g | 5.5 g |
| Solvent (b) | 17.0 g | 12.0 g | 8.0 g | 6.0 g |

(a) Trademark of a curing agent for a polyurethane resin, made by Hirono Chemical Co., Ltd.

| (b) Solvents | Parts by weight |
|---|---|
| Toluene | 39.0 |
| Ethyl acetate | 17.5 |
| Butyl acetate | 17.5 |
| Ethyl cellosolve acetate | 17.5 |
| Methyl isobutyl ketone | 3.9 |
| Xylene | 2.6 |
| Cyclohexane | 2.0 |

Carbon black dispersed resin solutions with the above-mentioned F/R ratios were coated onto an aluminum-deposited polyester film and cured at 100° C. for 2 hours.

Figure 4:
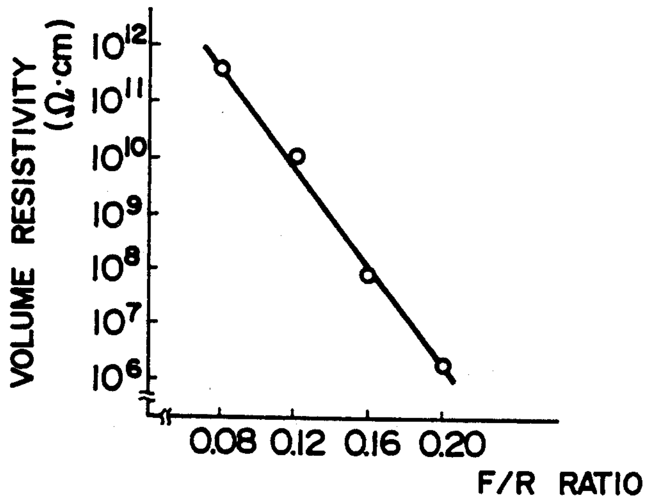
FIGS. 4, 5 and 6 are the graphs showing the relationship between the formulations of second coating layers and the volume resistivities thereof.

The coating was carried out using a commercially available spray gun (Trademark "TY-06" made by Olympos Co., Ltd.) with a nozzle diameter of 0.65 mm with an air pressure 3.0 kg/cm$^2$, so that coating with a thickness of about 30 $\mu$m was done. The volume resistivity was measured by the same Electrometer 610C as mentioned previously after allowing each sample sheet to stand at 20° C. and 60% RH for 16 hours. As the cell for measurement, No. 16008A type made by Yokogawa-Hewlett-Packard, Ltd. was used. The results are shown in FIG. 4.

(B) Modified Fluoroplastic - Carbon Black Dispersed System

The following components were dispersed in a ball mill to prepare a masterbatch.

| | |
|---|---|
| Modified fluoroplastic (Trademark "Lumifron LF-601-C" made by Asahi Glass Co., Ltd.) | 50 g |
| Carbon black (Trademark "Black Pearl L" made by Cabot Corp.) | 20 g |
| Toluene | 25 g |
| Xylene | 25 g |

Based on the masterbatch, a main ingredient and a curing agent were added in the following five F/R ratios (Resistance adjusting agent content/Resin solid content). The levels of F/R ratio are shown in Table 4.

TABLE 4

| | F/R Ratio | | | | |
|---|---|---|---|---|---|
| | 0.07 | 0.10 | 0.13 | 0.16 | 0.19 |
| Masterbatch | 10.0 g | 10.0 g | 10.0 g | 10.0 g | 10.0 g |
| Lumifron LF-601-C (Main ingredient) | 35.5 g | 23.6 g | 17.2 g | 13.1 g | 10.5 g |
| Lumifron LF-601-C (Curing agent)(c) | 7.9 g | 5.6 g | 4.3 g | 3.5 g | 2.9 g |
| Solvent (d) | 90.0 g | 60.0 g | 45.0 g | 35.0 g | 25.0 g |

(c) Trademark of a curing agent for a modified fluoroplastic, made by Asahi Glass Co., Ltd.

| (d) Solvents | Parts by weight |
|---|---|
| Toluene | 50.0 |
| Xylene | 50.0 |

Carbon black dispersed resin solutions with the above-mentioned F/R ratios were coated onto an aluminum-deposited polyester film and cured at 100° C. for 2 hours.

Figure 5:
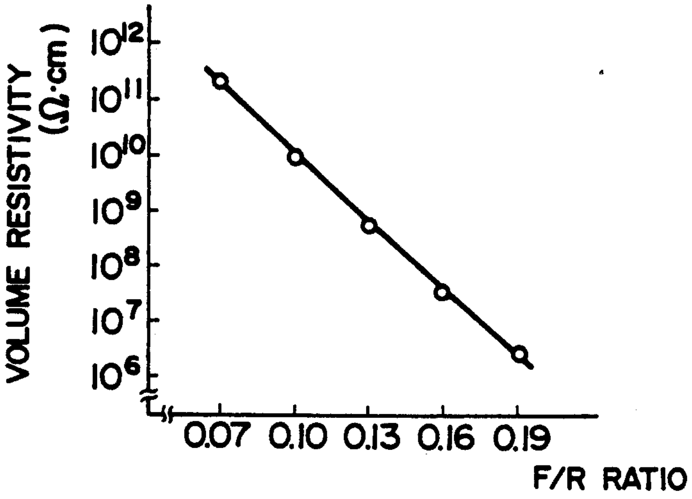

The methods of coating the carbon black dispersed resin solutions and measuring the volume resistivity of each coating layer are the same as those employed in (A). The results are shown in FIG. 5.

(C) Silicone Resin - Tin Oxide Dispersed System

The following components were dispersed in a ball mill to prepare a masterbatch.

| | |
|---|---|
| One-liquid type room temperature curing silicone resin (Trademark "Toray Silicone DC1-2577" made by Toray Industries, Inc.) | 53.3 g |
| Tin oxide particles (Trademark "T-1" made by Mitsubishi Metal Corporation.) | 20.0 g |
| Xylene | 46.7 g |

Based on the masterbatch, a main ingredient and a curing agent were added in the following four F/R ratios (Resistance adjusting agent content/Resin solid content). The levels of F/R ratio are shown in Table 5.

TABLE 5

| | F/R Ratio | | | |
|---|---|---|---|---|
| | 0.3 | 0.5 | 0.7 | 0.9 |
| Masterbatch | 10.0 g | 10.0 g | 10.0 g | 10.0 g |
| DC1-2577 | 8.9 g | 3.8 g | 1.7 g | 0.5 g |
| Xylene | 18.0 g | 8.0 g | 3.0 g | — |

The tin oxide particles (T-1) dispersed resin solutions with the above-mentioned F/R ratios were coated onto an aluminum-deposited polyester film and cured at 100° C. for 2 hours.

Figure 6:
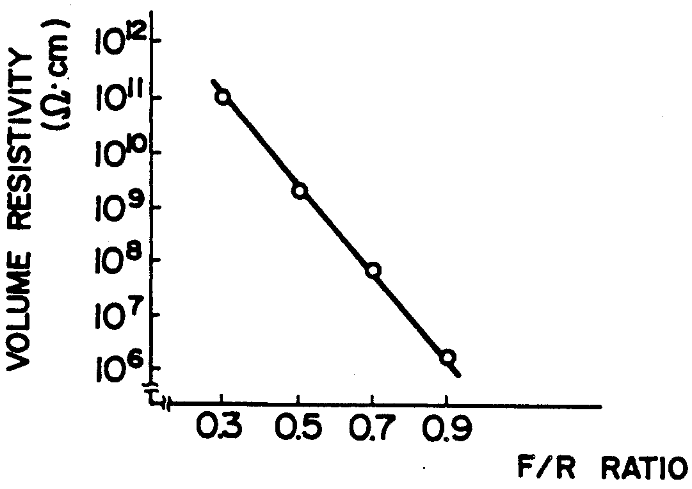

The methods of coating the tin oxide particles dispersed resin solutions and measuring the volume resistivity of each coating layer are the same as those employed in (A). The results are shown in FIG. 6.

The present invention will now be explained in detail by referring to the following examples and comparative examples.

Surface characteristics of the development roller were measured in accordance with the following tests.

(a) Charge Quantity of Toner

The charge quantity of toner in the development unit as shown in FIG. 1 was measured by the blow-off method with respect to the following toners, with the line speed of the development roller being 60 mm/sec, using a blade for forming a thin layer of toner, having a function of charging toner.

| | Parts by Weight |
|---|---|
| Positive charging toner | |
| Styrene - acrylic resin | 100 |
| Carbon black | 10 |
| Nigrosine dye | 2 |
| (Average particle size of toner: 10 $\mu$m) | |
| Negative charging toner | |
| Styrene - acrylic resin | 100 |
| Carbon black | 10 |
| Chrome-containing monoazo dye | 2 |
| (Average particle size of toner: 11 $\mu$m) | |

(b) Toner Releasability

Using the same toners, blade and development unit as those employed in the above test (a), the deposited state of toner on the development roller was evaluated after 72-hour operation in accordance with the following criteria.

Rank 1: Toner particles deposited on the surface of the development roller can be easily wiped off with a cloth.
Rank 2 A few toner particles remain after wiping off.
Rank 3: Toner particles cannot be completely wiped off, leaving a thin toner layer.
Rank 4: Fused toner particles firmly adhere to the surface of the development roller.

(c) Abrasion of the Development Roller

Using the same toners, blade and development unit as those employed in the test (a), the diameter of the development roller was measured by a commercially available gauge (Trademark "Laser Microgauge DT-4002A" made by Iwatsu Electric Co., Ltd.) after 360-hour operation. The abrasion of the developer (μm) was expressed as the difference between the diameter before the test and that after the test.

(d) Surface Smoothness of the Development Roller

The surface smoothness of the development roller was expressed as a dynamic coefficient of friction thereof.

The dynamic coefficient of friction between the lower material (steel (S45c)) and an upper material was measured under the following experimental conditions:

Experimental conditions: Plane against plane without lubricant. (partially modified Suzuki-type friction tester, with the both ends of concentric cylinders having an outer diameter of 20 mm and an inner diameter of 10 mm, with the lower cylinder rotating.)
Load: 1.95 kg
Speed: 6.2 cm/sec
Temp.: Room temperature in the air (According to Shozaburo Yamaguchi and Isamu Sekiguchi: Lubrication, 11, 12 (1966) p.485)

The above-mentioned properties (a) to (d) were measured with respect to the development rollers prepared in the following examples and comparative examples.

COMPARATIVE EXAMPLE 1-1

A comparative development roller 1-1 having a first coating layer made by an NBR prepared in accordance with the formulation 1-1 shown in Table 1, with the surface thereof ground to a surface roughness of 2 μm, was prepared.

EXAMPLE 1-1

On a first coating layer of a development roller, made of an NBR prepared in accordance with the formulation 1-1 shown in Table 1, a second coating layer with the above-mentioned formulation (A) with an F/R ratio of 0.20 in Table 3 was coated by spray coating, and then cured at 100° C. for 2 hours, whereby a development roller 1-1 having a second coating layer with a thickness of 30 μm according to the present invention was prepared.

EXAMPLE 1-2

On a first coating layer made of an NBR prepared in accordance with the formulation 1-2 shown in Table 1, a second coating layer with the previously mentioned formulation (B) with an F/R ratio of 0.10 in Table 4 was coated by spray coating, and then cured at 100° C. for 2 hours, whereby a development roller 1-2 having a second coating layer with a thickness of 30 μm according to the present invention was prepared.

EXAMPLE 1-3

A primer (Trademark "Aron Alpha Primer A" made by Toagosei Chemical Industry Co., Ltd.) was extremely thinly applied to a first coating layer made of an NBR prepared in accordance with the formulation 1-3 shown in Table 1. On this layer, a second coating layer with the previously mentioned formulation (C) with an F/R ratio of 0.30 in Table 5 was coated by spray coating, and then cured at 100° C. for 2 hours, whereby a development roller 1-3 having a second coating layer with a thickness of 30 μm according to the present invention was prepared.

The characteristics of each development roller are shown in Table 6.

TABLE 6

| Development Roller | Characteristics: Charge Quantity of Toner (μc/g) Positive Toner | Negative Toner | Toner Releasability | Abrasion (μm) | Volume Resistivity (Ω · cm) |
|---|---|---|---|---|---|
| Comparative Example 1-1 | +6.3 | −4.1 | 3 | 5.6 | $8.1 \times 10^6$ |
| Example 1-1 | +5.7 | −5.3 | 1 | 1 or less | $6.3 \times 10^6$ |
| Example 1-2 | +6.9 | −4.9 | 1 | 1 or less | $7.0 \times 10^9$ |
| Example 1-3 | +10.1 | −7.8 | 1 | 1.9 | $2.0 \times 10^{11}$ |

As shown in Table 6, the characteristics of the development rollers according to the present invention are improved in comparison with the comparative development roller.

In addition to the above-described examples, when an NBR-type first coating layer and a second coating layer, with the volume resistivities thereof being close to each other, are used in combination, the advantages of the present invention are available.

COMPARATIVE EXAMPLE 1-2

A carbon-containing silicone rubber layer was formed on an SUS core having a diameter of 16 mm by press-molding with a mixture of the following components cured under the following curing conditions:

| | Parts by Weight |
|---|---|
| Silicone rubber compound (Trademark "SH831U" made by Toray Industries, Inc.) | 100 |
| Carbon black (Trademark "Ketschen Black EC Carbon" made by AKZO chemie) | 3.5 |
| Vulcanizing agent (Trademark "RC-4" made by Toray Industries, Inc.) | 1 |
| Curing Conditions | |
| First vulcanizing | 170° C./10 min. (Press molding) |
| Second vulcanizing | 200° C./4 hrs. |

After the completion of the curing, the coating layer was subjected to surface grinding, whereby a comparative development roller 1-2 with a diameter of 20 mm was prepared.

EXAMPLE 1-4

A primer (Trademark "Toray Silicone DY39-020" made by Toray Industries, Inc.) was applied to the same carbon-containing silicone rubber layer as employed in Comparative Example 1-2 and then air-dried for 1 hour. On this layer, an addition-type silicone resin (Trademark "DCl-2577" made by Toray Industries, Inc.) was coated by spray coating and cured at 150° C. for 1 hour. The thus formed resin layer was subjected to successive surface grindings with Imprial Wrapping Films #320 and #600 (made by Sumitomo 3M Limited.), whereby a development roller 1-4 having a silicone resin layer with a thickness of 50 μm according to the present invention was prepared.

COMPARATIVE EXAMPLE 1-3

Polyester (Trademark "ODX-106" made by Dainippon Ink and Chemicals, Inc.) was dehydrated at 120° C. for 30 minutes under reduced pressure. To 100 parts by weight of the dehydrated polyester, 11 parts by weight of isocyanate (Trademark "Millionate MT" made by Nippon Polyurethane Industry Co., Ltd.) were added. This mixture was poured into a mold in which an SUS-made core with a diameter of 16 mm was placed, and then cured at 100° C. for 3 hours, whereby a development roller was prepared.

After the completion of the curing, the thus prepared development roller was subjected to surface grinding, whereby a comparative development roller 1-3 having a diameter of 20 mm was prepared.

EXAMPLE 1-5

Example 1-4 was repeated except that a potassium titanate fiber (Trademark "TISMO" made by Otsuka Chemical Co., Ltd.) was dispersed as a reinforcing material in the addition-type silicone resin employed in Example 1-4, at a ratio of 20 parts by weight to 100 parts by weight of the solid content of the resin, whereby a development roller 1-5 according to the present invention was prepared.

EXAMPLE 1-6

A fluorine-type copolymer resin (Trademark "Lumifron 610C" made by Asahi Glass Co., Ltd.) was coated onto the same development roller as employed in Comparative Example 1-3 by spray coating, and cured at 150° C. for 30 minutes. The thus obtained resin layer was subjected to surface grinding by the same method as employed in Example 1-4, whereby a development roller 1-6 having a fluoroplastic resin layer with a thickness of 50 μm according to the present invention was prepared.

EXAMPLE 1-7

An acrylic urethane resin (Trademark "Urethane Top #8500" made by Asia Industry Co., Ltd.) was coated onto the same development roller as employed in Comparative Example 1-3 by spray coating, and cured at 100° C. for 30 minutes. The thus obtained resin layer was subjected to surface grinding by the same method as employed in Example 1-4, whereby a development roller 1-7 having an acrylic urethane resin layer with a thickness of 50 μm according to the present invention was prepared.

The results of the evaluation with respect to the above-mentioned characteristics (a) to (d) of the development rollers are shown in Table 7.

TABLE 7

| Development Roller | Characteristics: Charge Quantity of Toner (μc/g) Positive Toner | Negative Toner | Toner Releas-ability | Abrasion (μm) | Coeffi-cient of Friction |
|---|---|---|---|---|---|
| Comparative Example 1-2 | +6.5 | −3.2 | 2 (Ad-hered) | 12.7 | 0.82 |
| Example 1-4 | +11.5 | −6.8 | 1 | 3.1 | 0.32 |
| Example 1-5 | +10.8 | −5.1 | 1 | 1.9 | 0.23 |
| Comparative Example 1-3 | +5.1 | −4.6 | 4 | 5.3 | 0.78 |
| Example 1-6 | +9.2 | −7.5 | 1 | 1 or less | 0.16 |
| Example 1-7 | +10.8 | −8.6 | 1 | 1 or less | 0.25 |

In addition to the previously mentioned first coating layers, the following first coating layers were prepared.

The peripheral surface of an electroconductive core having a diameter of 15 mm was subjected to degreasing, and a vulcanizable adhesive (Trademark "Kemlock 205" made by Road Far East Co., Ltd.) was coated on the surface and dried at room temperature for 30 minutes.

Each composition containing NBR, ECO, or a mixture thereof as a base component as shown in Table 8 was formed into a sheet having a thickness of 1 to 3 mm. This sheet was then wrapped around the adhesive-applied peripheral surface of the previously obtained core until the diameter of roll reached about 32 mm. The thus wrapped rubber sheet was heated and vulcanized at 160° C. for 30 minutes with application of a pressure of 100 kg/cm$^2$ in a mold for compression molding.

Thus, an elastic layer comprising NBR, ECO or a mixture thereof as the base component was formed. The thus formed elastic layer was subjected to surface grinding to smoothen the surface thereof, so that development rollers having a diameter of 27 mm including the elastic layer with a thickness of 6 mm were obtained.

The rubber hardness, compression set, volume resistivity and resistance to ozone of the thus prepared rollers are shown in Table 8. The measurements were carried out in the same manner as previously described.

TABLE 8

| Material | Maker | Acrylonitrite (%) | Fromulation 2-1 | Formulation 2-2 | Formulation 2-3 | Formulation 2-4 |
|---|---|---|---|---|---|---|
| Formulation | | | | | | |
| NBR: JSRN250SL | Japan Synthetic Rubber Co., Ltd. | 20 | 100 | — | — | 100 |
| NBR: JSRN260S | Japan Synthetic Rubber Co., Ltd. | 15 | — | 100 | — | — |
| NBR: NIPOL1312 | Japan Zeon Co., Ltd. | 32 | 30 | 30 | — | 30 |

TABLE 8-continued

| Material | Maker | Acrylonitrite (%) | Fromulation 2-1 | Formulation 2-2 | Formulation 2-3 | Formulation 2-4 |
|---|---|---|---|---|---|---|
| ECO: Epichlomer C | Ohsaka Soda Co., Ltd. | — | — | — | 100 | 100 |
| Softening Agent: Brown factice | Showa Chemical Industry Co., Ltd. | — | 10 | 10 | 10 | 20 |
| Lubricant: Stearic Acid | — | — | 0.5 | 0.5 | — | 0.5 |
| Mixing Agent: Zinc Stearate | — | — | — | — | 1 | 1 |
| Vulcanizing Promoting Agent: Sulfur | — | — | 5 | 5 | 5 | 10 |
| Vulcanizing Promoting Agent: Sulfax H | Tsurumi Kagaku Kogyo K.K. | — | 0.25 | 0.25 | 0.25 | 0.5 |
| Vulcanizing Promoting Agent: Sanceler TT | Sanshin Chemical Industry Co., Ltd. | — | 1 | 1 | — | 1 |
| Vulcanizing Promoting Agent: Sanceler DM | Sanshin Chemical Industry Co., Ltd. | — | 1.5 | 1.5 | — | 1.5 |
| Vulcanizing Promoting Agent: Sanfel R | Sanshin Chemical Industry Co., Ltd. | — | 1.0 | 1.0 | — | 1.0 |
| Vulcanizing Promoting Agent: Sanceler 22 | Sanshin Chemical Industry Co., Ltd. | — | — | — | 41.5 | 1.5 |
| | | Total | 149.25 | 149.25 | 117.75 | 267.0 |
| Vulcanizing Time 160° C. × (minute) | | | 30 | 30 | 30 | 30 |
| Characteristics | | | | | | |
| Rubber Hardness | | | 32 | 30 | 37 | 34 |
| Permanent Compressive Strain (%) | | | 3.1 | 4.8 | 8.6 | 5.3 |
| Volume Specific Resistance (Ω · cm) | | | $6 \times 10^3$ | $6 \times 10^{11}$ | $4 \times 10^6$ | $1 \times 10^8$ |
| Resistance to Ozone | | | A2 | A2 | A1 | A1 1 |

In addition to the previously mentioned second coating layers, the following second coating layers were prepared.

A variety of carbon blacks with different volatile contents are shown in Table 9.

TABLE 9

| Type of Carbon Black | Maker | Volatile Content |
|---|---|---|
| (i) Black Pearl #1300 | Cabot | 9.6 |
| (ii) Black Pearl L | " | 5.2 |
| (iii) Reagal #660 | " | 1.0 |
| (iv) Reagal #400 | " | 2.5 |
| (v) Vulcan XC-72 | " | 1.7 |

The above volatile contents were measured by extracting each carbon black with toluene and then determining the volatile content at 950° C.

Formulations of the carbon black - fluoroplastic at the time of dispersion in a ball mill are shown in Table 10.

TABLE 10

| Composition | Maker | Formulation 3-1 | Formulation 3-2 |
|---|---|---|---|
| (i) Various carbon black in Table 9 | Cabot | 20.0 g | 20.0 g |
| (ii) Resin: Lumifron LF-601 | Asahi Glass Co., Ltd. | 50.0 g | — |
| (iii) Resin: Lumifron LF-651 | Asahi Glass Co., Ltd. | — | 50.0 g |
| (iv) Solvent: Toluene | — | 30.0 g | 30.0 g |
| (v) Solvent: Xylene | — | 30.0 g | 30.0 g |

TABLE 10-continued

| Composition | Maker | Formulation 3-1 | Formulation 3-2 |
|---|---|---|---|
| Total | | 130.0 g | 130.0 g |

Each of the mixtures with the above-mentioned formulations as shown in Table 10 was dispersed in a ball mill for 10, 20, 40, 60 and 80 hours, respectively to form masterbatches.

Based on each of the thus obtained masterbatches, a resin and a curing agent were added so as to obtain an F/R of 0.10.

The formulations are shown in Table 11.

TABLE 11

| Composition | Maker | Formulation 3-1-1 | Formulation 3-2-2 |
|---|---|---|---|
| (i) Various Masterbatches | — | 10.0 g | 10.0 g |
| (ii) Resin: Lumifron LF-601 | Asahi Glass Co., Ltd. | 20.8 g | — |
| (iii) Resin: Lumifron LF-651 | Asahi Glass Co., Ltd. | — | 21.8 g |
| (iv) Solvent; Coronate EH | Nippon Polyurethane Industry Co., Ltd. | 3.04 g | 2.5 g |
| (v) Solvent: Toluene/ Xylene = 1/1 | — | 60.0 g | 64.0 g |
| Total | | 93.84 g | 98.3 g |

Basic properties of a fluoroplastic and a curing agent are shown in Table 12.

TABLE 12

| Material | Solid Content (wt. %) | OH value (mg KOH/g polymer) | Acid value (mg KOH/ g polymer) | NCO Content (%) |
|---|---|---|---|---|
| (i) Lumifron LF-601 | 50 | 61 | 0 | — |
| (ii) Lumifron LF-651 | 50 | 55 | 6 | — |
| (iii) Coronate EH* | 100 | — | 1 | 21.3 |

*Aliphatic isocyanate (Hexamethylene diisocyanate)

Each carbon black dispersed resin solution shown in Table 11 was coated onto an aluminum-deposited polyester film and cured at 100° C. for 2 hours.

The coating was carried out by using the same spray gun as mentioned previously in the same conditions, with a coating thickness of about 30 μm. The volume resistivity was measured with a high-ohmeter (Trademark "4329A-type" made by Yokogawa-Hewlett-Packard, Ltd. after allowing the sample sheet to stand at 20° C. and 60% RH for 16 hours. As the cell for measurement, No. 16008A type made by Yokogawa-Hewlett-Packard, Ltd. was used.

Figure 8:
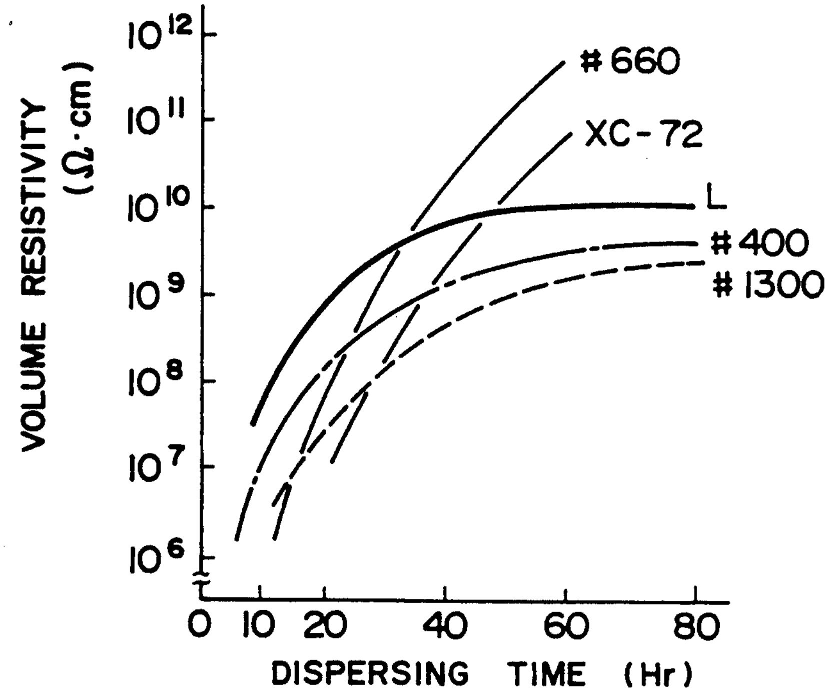
FIGS. 8 and 9 are the graphs showing the relationship between the dispersion time of carbon black in a fluorine-containing resin and the volume resistivity thereof.
Figure 9:
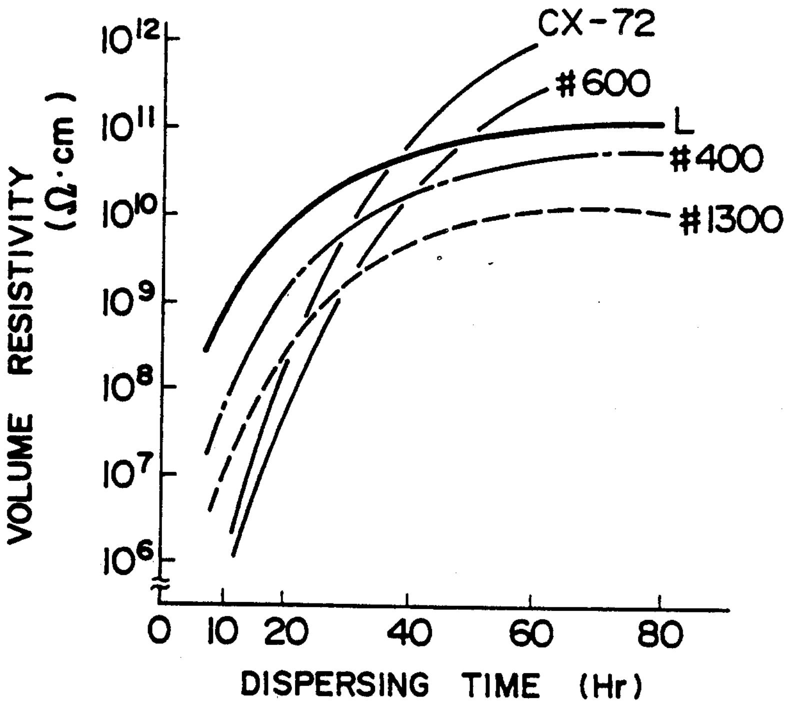

With respect to Lumifron LF-601 and Lumifron LF-651, the results are shown in FIGS. 8 and 9, respectively.

As shown in FIGS. 8 and 9, with respect to black carbons having comparatively low volatile contents, and therefore with a small amount of oxygen adsorbed on the surface of carbon black, such as Reagal #660 and Vulcan XC-72, as the dispersion time increases, the dispersion proceeds, so that the electroconductivity thereof is decreased. It is considered that this is because the structure destruction of carbon black will advance in proportion to the dispersion time. In contrast to this, the electroconductivity of the carbon black with a comparatively large volatile content scarcely decrease after a certain period of time even when the dispersion time is extended. Accordingly, the carbon black dispersed resin solution having stable electrical characteristics can be obtained.

As to the Lumifron LF-651 containing carboxyl groups in the resin structure, the volume resistivity is increased in increments of the dispersion property of the carbon black, but the dispersion stability thereof is not changed. Therefore, it is preferable that the volatile content of black carbon suitable for the resin solution for use in the present invention be in the range of 2.5 to 9.6%.

The following carbon black dispersed resin solutions were likewise prepared by using the formulations in Table 13.

TABLE 13

| Composition | Maker | Formulation 4-1 | Formulation 4-2 | Formulation 4-3 |
|---|---|---|---|---|
| Various Carbon black in Table 9 | — | 20.0 g | 20.0 g | 20.0 g |
| Fluoroplastic (Lumifron LF-601-C) | Asahi Glass Co., Ltd. | 50.0 g | — | — |
| Urethane Resin (Ulack C-230U) | Hirono Chemical Co., Ltd. | — | 100.0 g | — |
| Silicone Resin (One-liquid type) (DCI-2577) | Toray Silicone Co., Ltd. | — | — | 50.0 g |

TABLE 13-continued

| Composition | Maker | Formulation 4-1 | Formulation 4-2 | Formulation 4-3 |
|---|---|---|---|---|
| Toluene | — | 25.0 g | — | — |
| Xylene | — | 25.0 g | — | — |
| Total | | 120.0 g | 120.0 g | 70.0 g |

Each of the mixtures with the above-mentioned formulation as shown in Table 13 were dispersed in a ball mill for 10, 20, 40, 60 and 80 hours to prepare the respective masterbatches.

Based on the thus obtained masterbatches with different dispersion times, a resin and a curing agent were added and adjusted to an F/R ratio of 0.10 to form coating compositions.

The formulations of the above-mentioned coating composition are shown in Table 14.

TABLE 14

| Material | Fluoroplastic | Urethane resin | Silicone resin |
|---|---|---|---|
| Main ingredient | | | |
| Masterbatch | 10.0 g | 10.0 g | 10.0 g |
| Lumifron LF-601-C | 23.6 g | — | — |
| Yulack C-230U | — | 28.7 g | — |
| DCI-2577 (One-liquid type) | — | — | 30.2 g |
| Hardener | | | |
| Lumifron 601 Hardener | 5.6 g | — | — |
| Yulack PU-614 | — | 11.1 g | — |
| Solvent | | | |
| (a) | 60.0 g | — | — |
| (b) | — | 15.0 g | — |
| (c) | — | — | 60.0 g |
| Total | 99.2 g | 64.8 g | 100.2 g |

| Solvent | | Parts by weight |
|---|---|---|
| (a) | Toluene | 50.0 |
| | Xylene | 50.0 |
| (b) | Toluene | 39.0 |
| | Ethyl acetate | 17.5 |
| | Butyl acetate | 17.5 |
| | Ethyl cellosolve acetate | 17.5 |
| | Methyl isobutyl ketone | 3.9 |
| | Xylene | 2.6 |
| | Cyclohexane | 2.0 |
| (c) | Xylene | 100.0 |

Each of the carbon black dispersed resin solutions with the above-mentioned F/R ratios were coated onto an aluminum-deposited polyester film and cured at 100° C. for 2 hours.

The coating was carried out by using the same spray gun as mentioned previously under the same conditions, with a coating thickness of about 30 μm. The volume resistivity was measured with the above Micrometer after allowing the sample sheet to stand at 20° C. and 60% RH for 16 hours. As the cell for measurement, No. 16008A type made by Yokogawa-Hewlett-Packard, Ltd. was used.

Figure 10:
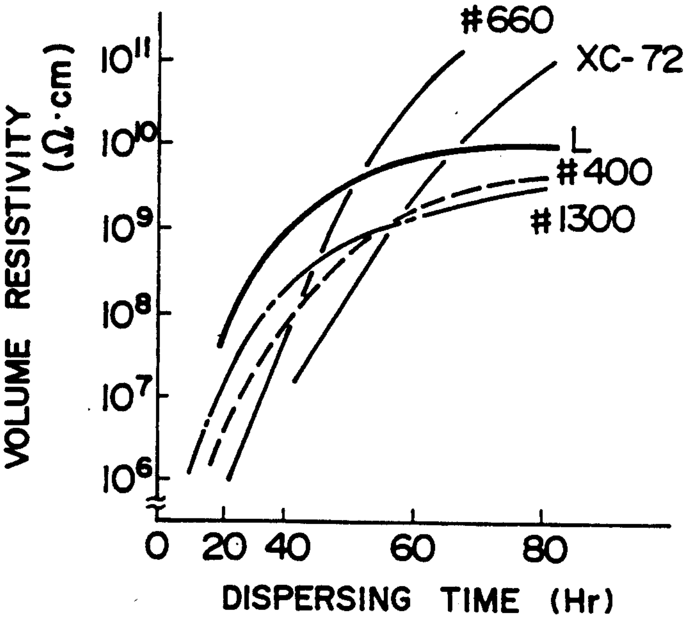
FIGS. 10, 11 and 12 are the graphs showing the relationship between the dispersion time of carbon black in resins and the volume resistivities thereof.
Figure 11:
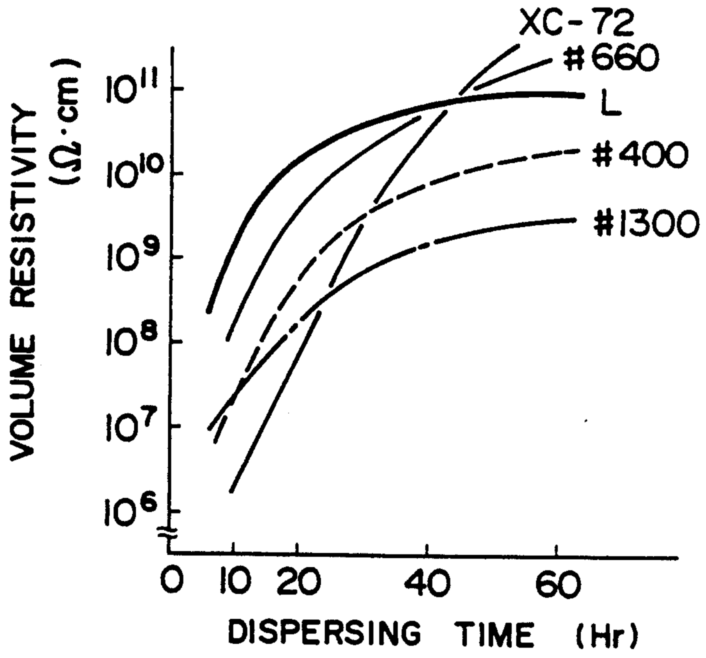
Figure 12:
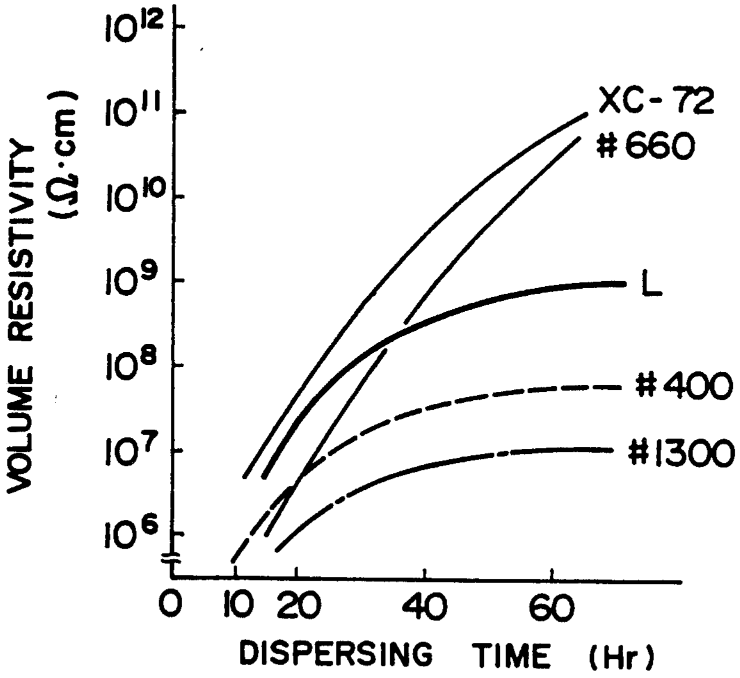

With respect to a fluoroplastic, an urethane resin and a silicone resin, the results of measurement are shown in FIG. 10, FIG. 11, and FIG. 12, respectively.

As shown in FIGS. 10 through 12, with respect to black carbons having comparatively low volatile contents and therefore with a small amount of oxygen adsorbed on the surface of carbon black, such as Reagal #660 and Vulcan XC-72, as the dispersion time increases, the dispersion proceeds, so that the electroconductivity thereof is decreased. It is considered that this is because the structure destruction of carbon black will advance in proportion to the dispersion time. In contrast to this, the electroconductivity of the carbon black with a comparatively large volatile content scarcely decreases after a certain period of time even when the dispersion time is extended. Accordingly, the carbon black dispersed resin solution having stable electrical characteristics can be obtained.

A Lumifron - Black Pearl L dispersion solution was dispersed in a ball mill for 72 hours to prepare the masterbatch thereof. The formulations were the same as previously mentioned (Formulations 3-1 and 3-2 in Table 10).

Based on the thus obtained masterbatches, a resin and a curing agent were added so as to obtain the following four F/R ratios. The formulations corresponding to the F/R ratios are shown in Tables 15 and 16.

TABLE 15

| | F/R Ratio | | | |
|---|---|---|---|---|
| Material | 0.05 | 0.10 | 0.15 | 0.20 |
| (i) Masterbatch (Formulation 3-1 in Table 10) | 10.0 g | 10.0 g | 10.0 g | 10.0 g |
| (ii) Resin: Lumifron LF-601 | 45.6 g | 20.8 g | 12.6 g | 8.5 g |
| (iii) Hardener: Coronate EH | 6.1 g | 3.0 g | 2.0 g | 1.5 g |
| (v) Solvent: Toluene/ Xylene = 1/1 | 110.0 g | 60.0 g | 46.0 g | 38.0 g |
| Total | 117.7 g | 93.8 g | 70.6 g | 58.0 g |

TABLE 16

| | F/R Ratio | | | |
|---|---|---|---|---|
| Material | 0.05 | 0.10 | 0.15 | 0.20 |
| (i) Masterbatch (Formulation 3-2 in Table 10) | 10.0 g | 10.0 g | 10.0 g | 10.0 g |
| (ii) Resin: Lumifron LF-601 | 47.1 g | 21.8 g | 13.3 g | 8.9 g |
| (iii) Hardener: Coronate EH | 5.0 g | 2.5 g | 1.70 g | 1.3 g |
| (v) Solvent: Toluene/ Xylene = 1/1 | 114.0 g | 64.0 g | 46.0 g | 38.0 g |
| Total | 176.1 g | 98.3 g | 71.0 g | 58.2 g |

Each of the carbon black (Black Pearl L) dispersed resin solutions with the above-mentioned F/R ratios was coated onto an aluminum-deposited polyester film and cured at 100° C. for 2 hours.

Figure 13:
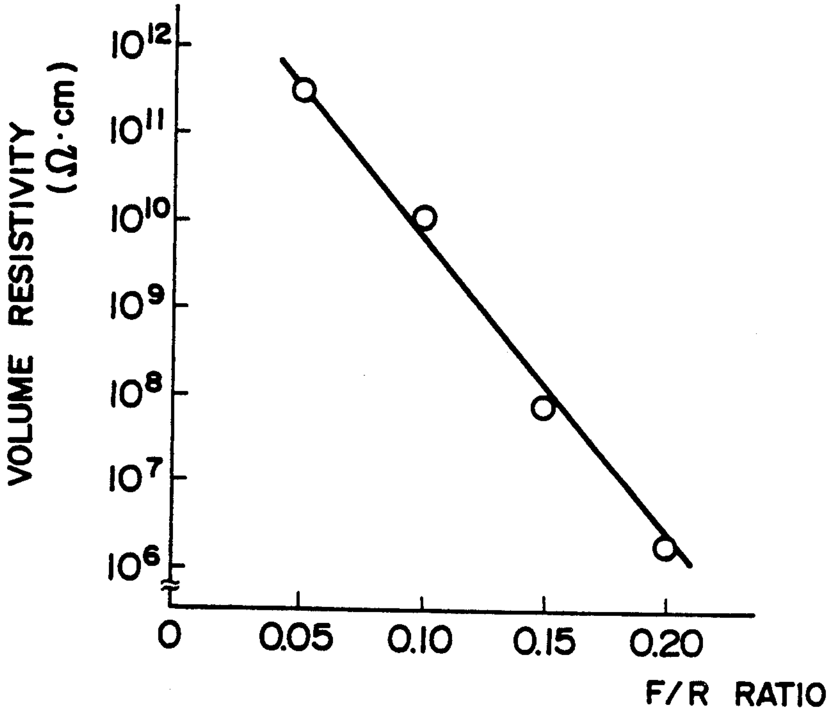
FIGS. 13, 14, 15 and 16 are the graphs showing the relationship between the F/R ratios of the compositions of second coating layers and the volume resistivities thereof.
Figure 14:
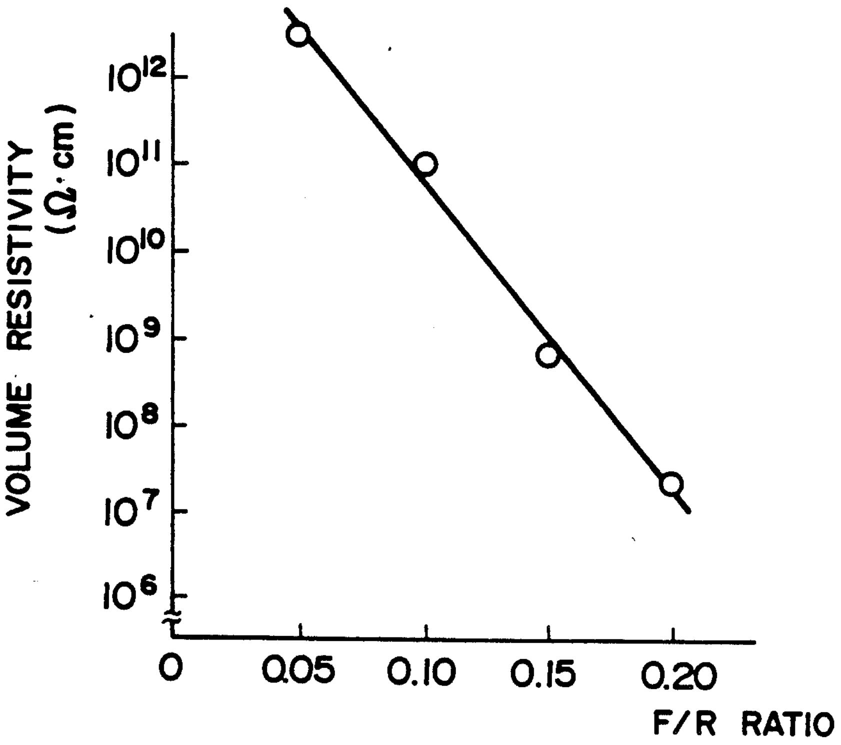

The method of coating the above solution and the method of measuring the volume resistivity thereof were the same as previously mentioned. The results of measurement are shown in FIGS. 13 and 14.

Further, a fluoroplastic - Black Pearl L dispersed solution was dispersed in a ball mill for 72 hours to prepare the masterbatch thereof The formulation is given in the Formulation 4-1 in Table 13.

Based on the thus obtained masterbatches, a resin and a curing agent were added so as to obtain the following five F/R ratios. The formulations corresponding to the F/R ratios are shown in Table 17.

TABLE 17

| | F/R Ratio | | | | |
|---|---|---|---|---|---|
| Material | 0.07 | 0.10 | 0.13 | 0.16 | 0.19 |
| Masterbatch | 10.0 g | 10.0 g | 10.0 g | 10.0 g | 10.0 g |
| Lumifron LF-601-C (Main ingredient) | 35.5 g | 23.6 g | 17.2 g | 13.1 g | 10.5 g |
| Lumifron LF-601-C (Curing agent)(c) | 7.9 g | 5.6 g | 4.3 g | 3.5 g | 2.9 g |
| Solvent (d) | 90.0 g | 60.0 g | 45.0 g | 35.0 g | 25.0 g |

(c) Trademark of a curing agent for a modified fluoroplastic, made by Asahi Glass Co., Ltd.

(d) Solvents

| Solvents | Parts by weight |
|---|---|
| Toluene | 50.0 |
| Xylene | 50.0 |

Each of the carbon black (Black Pearl L) dispersed resin solutions with the above-mentioned F/R ratios was coated onto an aluminum-deposited polyester film and cured at 100° C. for 2 hours.

Figure 15:
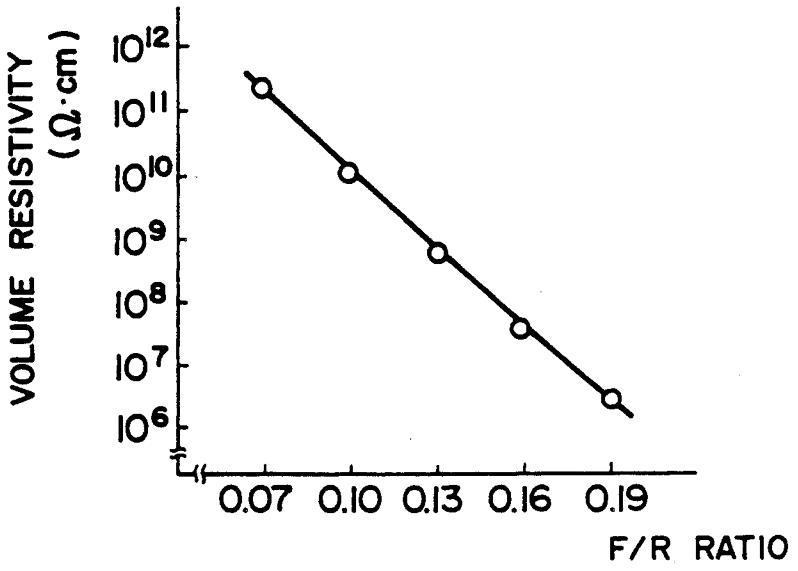

The method of coating the above solution and the method of measuring the volume resistivity thereof are the same as previously mentioned. The results of measurement are shown in FIG. 15.

Further, a silicon resin - Black Pearl L dispersed solution was dispersed in a ball mill for 48 hours to prepare the masterbatch thereof. The formulation is given in the Formulation 4-3 in Table 13.

Based on the thus obtained masterbatches, a resin and a curing agent were added so as to obtain the following four F/R ratios. The formulations corresponding to the F/R ratios are shown in Table 18.

TABLE 18

| | F/R Ratio | | | |
|---|---|---|---|---|
| Material | 0.08 | 0.10 | 0.12 | 0.14 |
| Masterbatch | 10.0 g | 10.0 g | 10.0 g | 10.0 g |
| DCI-2577 (One-liquid type) | 40.5 g | 30.2 g | 24.6 g | 20.1 g |
| Toluene | 80.0 g | 60.0 g | 50.0 g | 40.0 g |

Each of the carbon black (Black Pearl L) dispersed resin solutions with the above-mentioned F/R ratios was coated onto an aluminum-deposited polyester film and cured at 150° C. for 20 minutes.

Figure 16:
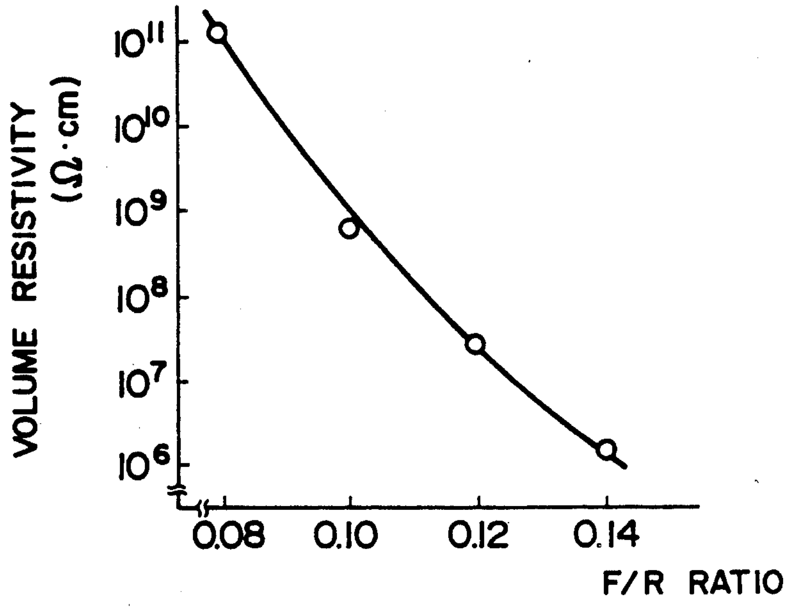

The method of coating the above solution and the method of measuring the volume resistivity thereof are the same as previously mentioned. The results of measurement are shown in FIG. 16.

EXAMPLE 2-1

On a first coating layer made of a mixture of NBR and ECO with the formulation 2-4 shown in Table 8, a second coating layer with the formulation with an F/R ratio of 0.10 shown in Table 15 was coated by spray coating, and then cured at 100° C. for 2 hours, whereby a development roller 2-1 having a second coating layer with a thickness of 30 μm according to the present invention was prepared.

EXAMPLE 2-2

On a first coating layer of a development roller, made of an NBR prepared in accordance with the formulation 2-3 shown in Table 8, a second coating layer with the formulation with an F/R ratio of 0.10 in Table 15 was coated by spray coating, and then cured at 100° C. for 2 hours, whereby a development roller 2-2 having a second coating layer with a thickness of 30 μm according to the present invention was prepared.

EXAMPLE 2-3

On a first coating layer made of an NBR prepared in accordance with the formulation 2-2 shown in Table 8, a second coating layer with the formulation with an F/R ratio of 0.10 in Table 16 was coated by spray coating, and then cured at 100° C. for 2 hours, whereby a development roller 2-3 having a second coating layer with a thickness of 30 μm according to the present invention was prepared.

The charge quantity of toner, toner releasability, abrasion, volume resistivity, and resistance to ozone of the above development rollers 2-1, 2-2, and 2-3 according to the present invention were measured. The results are given in Table 19. With respect to the charge quantity of toner, the development unit as shown in FIG. 17 was employed.

TABLE 19

| Example | Charge Quantity of Toner (μc/g) Positive Toner | Negative Toner | Toner Releasability | Coefficient of Friction | Abrasion (μm) | Volume Resistivity (Ω · cm) | Resistance to Ozone |
|---|---|---|---|---|---|---|---|
| Example 2-1 | +8.3 | −7.3 | Lank 1 | 0.18 | 1 or less | $2.1 \times 10^8$ | A1 |
| Example 2-2 | +11.2 | −9.6 | Lank 1 | 0.16 | 1 or less | $6.0 \times 10^6$ | A1 |
| Example 2-3 | +9.6 | −7.1 | Lank 1 | 0.14 | 1 or less | $1.6 \times 10^{11}$ | A1 |

COMPARATIVE EXAMPLE 3-1

A comparative development roller 3-2 having a first coating layer made by an NBR prepared in accordance with the formulation 1-2 shown in Table 1, with the surface thereof ground to a surface roughness of 2 μm, was prepared.

COMPARATIVE EXAMPLE 3-1

On a first coating layer of a development roller, made of an NBR prepared in accordance with the formulation 1-2 shown in Table 1, a second coating layer with the formulation of a Vulcan XC-72 - fluoroplastic with an F/R ratio of 0.10 in Table 14 was coated by spray coating, and then cured at 100° C. for 2 hours, whereby a comparative development roller 3-1 having a second coating layer with a thickness of 30 μm was prepared.

EXAMPLE 3-1

On a first coating layer made of an NBR-ECO mixture prepared in accordance with the formulation 1-4 shown in Table 1, a second coating layer with the formulation of a Black Pearl L - fluoroplastic with an F/R ratio of 0.10 in Table 14 was coated by spray coating, and then cured at 100° C. for 2 hours, whereby a development roller 3-1 having a second coating layer with a thickness of 30 μm according to the present invention was prepared.

EXAMPLE 3-2

On a first coating layer made of an NBR-ECO mixture prepared in accordance with the formulation 1-5 shown in Table 1, a second coating layer with the formulation of a Black Pearl L - fluoroplastic with an F/R ratio of 0.13 shown in Table 17 was coated by spray coating, and then cured at 100° C. for 2 hours, whereby a development roller 3-2 having a second coating layer with a thickness of 30 μm according to the present invention was prepared.

EXAMPLE 3-3

On a first coating layer made of an NBR-ECO mixture prepared in accordance with the formulation 1-5 shown in Table 1, a second coating layer with the formulation of a Black Pearl L - urethane resin with an F/R ratio of 0.16 in Table 3 was coated by spray coating, and then cured at 100° C. for 2 hours, whereby a development roller 3-3 having a second coating layer with a thickness of 30 μm according to the present invention was prepared.

EXAMPLE 3-4

A primer (Trademark "Aron Alpha Primer A" made by Toagosei Chemical Industry Co., Ltd.) was extremely thinly applied to a first coating layer made of an NBR-ECO mixture prepared in accordance with the formulation 1-5 shown in Table 1. On this layer, a second coating layer with the formulation of a Black Pearl L - silicone resin with an F/R ratio of 0.10 in Table 18 was coated by spray coating, and then cured at 150° C. for 30 minutes, whereby a development roller 3-4 having a second coating layer with a thickness of 30 μm according to the present invention was prepared.

The characteristics of each development roller are shown in Table 20.

TABLE 20

| Characteristics Development Roller | Charge Quantity of Toner (μc/g) Positive Toner | Negative Toner | Toner Releasability | Abrasion (μm) | Volume* Resistivity (Ω · cm) Minimum | Maximum | Resistance to Ozone Surface | Both Sides |
|---|---|---|---|---|---|---|---|---|
| Comparative Example 3-1 | +6.3 | −4.8 | 3 | 5.8 | $2.8 \times 10^9$ | $3.2 \times 10^9$ | A2 | A2 |
| Comparative Example 3-2 | +6.8 | −7.2 | 1 | 1.0 or less | $1.0 \times 10^9$ | $8.3 \times 10^{10}$ | A1 | A2 |
| Example 3-1 | +7.4 | −6.2 | 1 | 1.0 or less | $1.8 \times 10^{10}$ | 2.6 × 1010 | A1 | A2 to A1 |
| Example 3-2 | +6.5 | −5.1 | 1 | 1.0 or less | $3.1 \times 10^9$ | $4.2 \times 10^9$ | A1 | A1 |
| Example 3-3 | +6.3 | −4.7 | 1 | 1.0 or less | $8.9 \times 10^7$ | $1.6 \times 10^9$ | A1 | A1 |

TABLE 20-continued

| Characteristics Development Roller | Charge Quantity of Toner (μc/g) Positive Toner | Negative Toner | Toner Releasability | Abrasion (μm) | Volume* Resistivity (Ω · cm) Minimum | Maximum | Resistance to Ozone Surface | Both Sides |
|---|---|---|---|---|---|---|---|---|
| Example 3-4 | +11.1 | −8.2 | 1 | 2.1 | $7.3 \times 10^9$ | $8.3 \times 10^9$ | A1 | A1 |

*The volume resistivity was measured at six points in the direction of the width of each development roller, so that the maximum and minimum values were obtained.

What is claimed is:

1. A member for developing electrostatic latent images to visible images, comprising a support, a first coating layer comprising an elastic material formed on said support, and a second coating layer comprising an electroconductive material and a flexible resin having an elongation ration of 10% to 500% formed on said first coating layer, said flexible resin being a resin prepared by cross-linking a fluorine-containing copolymer comprising a fluoro-olefin and a hydroxyl-group containing vinyl ether through a polyfunctional isocyanante, wherein said first and second coating layers have a volume resistivity of $10^6$ to $10^{11}$ Ω·cm, and wherein said elastic material of said first coating layer comprises as a base material a material selected from the group consisting of nitrile rubber, epichlorohydrin rubber, urethane resin, silicone resin, and mixtures thereof.

2. The member for developing electrostatic latent images as claimed in claim 1, wherein said electroconductive material is carbon black.

3. The member for developing electrostatic latent images as claimed in claim 1, wherein said fluorine-contained copolymer contains 25 wt. % to 32 wt. % of fluorine, and has a specific gravity of 1.4 to 1.5, an OH value of 40 to 150 mgKOH/g-resin, an acid value of 0 to 30 mgKOH/g-resin, a number-average molecular weight of $0.4\times10^4$ to $10\times10^4$, a weight-average molecular weight of $0.8\times10^4$ to $20\times10^4$, a glass transition temperature of 0° C. to 70° C., a heat decomposition starting temperature of 240° C. to 250° C., and a solubility parameter of 8 to 9.

4. The member for developing electrostatic latent images as claimed in claim 1, wherein said second coating layer has a thickness of 5 μm to 70 μm.

* * * * *

UNITED STATES PATENT AND TRADEMARK OFFICE

CERTIFICATE OF CORRECTION

PATENT NO. : 4,994,319

DATED : February 19, 1991

INVENTOR(S) : Kazuo Nojima et al

It is certified that error appears in the above-indentified patent and that said Letters Patent is hereby corrected as shown below:

Column 11, line 11, after "Rank 2", insert --:--.

Col. 12, line 34, delete "20X1011" insert --2.0 X $10^{11}$--

Column 14, Table 8, delete "Fromulation", insert --Formulation--.

Column 16, Table 8 cont., delete "41.5", insert --1.5--;
Table 11, after "Solvent", delete ";", insert --:--.

Column 18,
line 35, move "60.0" to column with the heading --Silicone resin--

UNITED STATES PATENT AND TRADEMARK OFFICE

CERTIFICATE OF CORRECTION

PATENT NO. : 4,994,319

DATED : February 19, 1991

INVENTOR(S) : Kazuo Nojima et al

It is certified that error appears in the above-indentified patent and that said Letters Patent is hereby corrected as shown below:

Column 19, line 58, after "thereof", insert --.--.

Column 22, line 52, Example 3-1, delete "2.6X1010" insert --2.6 X $10^{11}$--

Column 23, line 18, delete "ration", insert --ratio--.

Signed and Sealed this

Twenty-sixth Day of October, 1993

Attest:

BRUCE LEHMAN

Attesting Officer

*Commissioner of Patents and Trademarks*